United States Patent [19]

Parkinson et al.

[11] Patent Number: 4,975,122

[45] Date of Patent: Dec. 4, 1990

[54] WATER RESISTANT CEMETITIOUS MATERIALS

[75] Inventors: Jeffrey K. Parkinson, Lawrenceville; Anthony J. O'Lenick, Jr., Lilburn, both of Ga.

[73] Assignee: Siltech Inc., Norcross, Ga.

[21] Appl. No.: 392,560

[22] Filed: Aug. 10, 1989

[51] Int. Cl.$^5$ .............................................. C04B 24/28
[52] U.S. Cl. ................................... 106/727; 106/781; 106/806; 106/823
[58] Field of Search ............... 106/314, 823, 781, 727, 106/806; 524/3

[56] References Cited

U.S. PATENT DOCUMENTS 3,190,760  6/1965  Carlson et al. ...................... 106/727
3,455,710  7/1969  Nitzche et al. ...................... 106/781
3,623,895  11/1971 Nitzche et al. ...................... 106/781

FOREIGN PATENT DOCUMENTS 1224321  3/1971  United Kingdom .................... 524/3

*Primary Examiner*—Mark L. Bell
*Assistant Examiner*—Deborah Jones

[57] ABSTRACT

An improved water-resistant cementitious composition and products made therefrom are provided by forming an aqueous cementitious slurry, as for example of calcined gypsum and adding an organic amine preferably containing a hydroxyl functionality and a silanic hydrogen containing silicone compound. The slurry is set in conventional manner by heating and drying. The resulting product has a high degree of water-resistance and has no adverse effect upon the physical properties of the board.

19 Claims, No Drawings

WATER RESISTANT CEMETITIOUS MATERIALS

BACKGROUND OF THE INVENTION (1) Field of Invention

The present invention relates to cementitious compositions, and more particularly refers to a gypsum composition having a higher degree of water-resistance than has been obtained in the prior art. Another aspect of the invention relates to a polymerization of an organic amine and a silanic hydrogen containing silicone polymer, in a cementitious matrix.

(2) Description of the Prior Art

Regular gypsum wallboard and similar products have very little resistance to water. When ordinary gypsum wallboard is immersed in water at room temperature, for example, 70 degrees F., the lack of water resistance is readily demonstrated by the fact that in a short time the gypsum core has absorbed a considerable amount of water. Actual tests have demonstrated that when a 2×2×2 inch cube of gypsum board core material is immersed in water at about 70 degrees F., the material shows a water absorption of greater than 70% after having been immersed for 2 hours. Many attempts have been made in the past to improve the water resistance of gypsum products. These attempts included the incorporation of water-resistant materials such as metallic soaps, asphalts, waxes, resins, etc., within the wet calcium sulfate mixture. They have also included attempts to coat the finished gypsum board with water-resistant films or coatings.

One example of past attempts to waterproof gypsum products integrally by the addition of water-repellent substances is that disclosed in the King and Camp U.S. Pat. No. 2,199,776. This disclosure teaches the incorporation of paraffin wax, asphalt, or other fusible water-insoluble organic substances into a gypsum mix by first melting this waxy material and then dispersing such material into the wet gypsum mix by spraying the hot molten mass into the aqueous gypsum dispersion. This brings about a formation of finely dispersed solidified paraffin or asphalt particles which then serve to improve the water resistance of the gypsum product. While these past efforts resulted in some degree of success, there has been no waterproofing process developed in the past which was capable of causing a drastic increase in water-resistance by the use of only a comparatively very small amount of waterproofing materials.

Water resistant agents which include asphalt, wax and other water insoluble materials generally provide water resistance only at the outermost surface of the item being produced. This is because the mechanism of action is the blooming to the surface of the water insoluble oil as the item sets up and cures. Any water insoluble material which fails remains in the asphalt, effects adversely the physical properties of the board.

Camp U.S. Pat. No. 2,432,963 discloses that if a mixture of paraffin wax and asphalt, in definite proportions, say on the order of from about 5% to about 15% (dry basis), is incorporated in the form of an emulsion with a wet plastic gypsum mass, the finished dried gypsum wallboard will possess a degree of water resistance which is greatly out of proportion to the degree of water resistance obtained if one uses these same paraffin wax and asphalt materials without emulsification. The degree of water-resistance obtained by the use of a mixture of paraffin wax and asphalt in certain proportions is very much greater than that obtained when one uses either the wax alone or the asphalt alone in emulsified form. Camp U.S. Pat. No. 2,526,537 has disclosed a water-resistant gypsum product having added therein a composition of asphalt, paraffin wax and potassium sulfate.

Camp U.S. Pat. No. 2,526,538 discloses a water-resistant product comprising gypsum and a composition of asphalt, paraffin wax and a substance selected from the group consisting of alkali and alkaline earth aluminates and Portland cement.

Selbe U.S. Pat. No. 2,669,414 discloses a water-resistant gypsum composition formed by adding to a gypsum slurry a blend of oil-soluble alkali salt of mahogany sulfonic acid with asphalt and paraffin wax.

In "The Elvasize Process" published by the Du Pont Company there is described a method for first coating polyvinyl alcohol on paper and then adding borax to control the penetration of the polyvinyl alcohol size into the paper. However, the process described is for sizing paper making it somewhat water resistant and not for preparing truly water-resistant gypsum board.

U.S. Pat. No. 3,853,689 teaches that the sag resistance of gypsum board is improved by incorporating a small amount of polyvinyl alcohol in the gypsum core of the board.

U.S. Pat. No. 3,935,021 teaches that the water-resistance of gypsum products such as gypsum wallboard is improved by incorporating into the composition from which the gypsum product is made a combination of polyvinyl alcohol and asphalt-wax emulsion. However, the patent teaches that at least 0.15 weight percent of polyvinyl alcohol must be utilized in order to obtain acceptable results. Since the cost of polyvinyl alcohol is substantial, economic considerations represent a formidable block to the commercialization of this patented product. In evaluating the prior art discussed above, it is clear that many of the compositions yield products having good water-resistant properties, but that the cost of the materials is undesirably high and that a less expensive means of rendering gypsum board water-resistant would be highly desirable to obtain a competitive advantage in the market. Further, the incorporation of abnormally high amounts of materials such as asphalt and wax to obtain an even higher degree of water resistance may have deleterious effects on the properties of the finished product.

U.S. Pat. No. 4,094,694 issued May 1977 to Long, teaches that asphalt and wax and a minor amount of borax can be added to gypsum to increase the water resistance.

Isobutyl trimethoxy silane and related monomers have been applied to the surface of the cement and to a limited extent gypsum board. These materials will self polymerize to form a surface coating which is water resistant. In addition to being very expensive, the coating is only effective on the surface. As previously stated, many high performance cementitious materials are used were water resistance throughout the item is necessary due for example to exposure to weather. Prior to this invention, no approach described has been successful in producing a truly water resistant system.

SUMMARY OF THE INVENTION

It is accordingly an object of the present invention to provide a waterproofing composition which, when added to a cementitious aqueous slurry such as an aqueous calcined gypsum slurry, and formed into products such as gypsum board, results in a product having a high degree of water-resistance. The process involves a polymerization reaction of the silanic hydrogen containing silicone polymer and an organic amine, preferably containing hydroxyl groups, which occurs at the same time the cementitious materials are crystallizing, setting up and curing. The result is an intertwined polymer matrix in the cementitious material. This intertwined system provides the water resistance throughout the matrix. The speed of polymerization can be matched to the speed of setting up of the cementitious material. This is accomplished by selection of the type and concentration of amine and silanic hydrogen containing compound.

It is a further object of the invention to provide a composition for adding to a gypsum slurry to form gypsum wallboard which has a higher degree of water-resistance.

It is still further and object to provide a composition for rendering gypsum wallboard water-resistant which can utilize a smaller amount of composition, and thereby accomplishing an economy in wallboard cost while still providing the same degree of water-resistance as provided by prior art compositions.

It will be understood that the cementitious materials for which these materials can be used include gypsum, portland cement, and other crystalline cementitious materials.

Still other objects and advantages will readily present themselves to one skilled in the art upon reference to the following specification and claims.

DESCRIPTION OF THE PREFERRED EMBODIMENTS

According to the invention it had been discovered that gypsum wallboard of enhanced water-resistance can be provided by introducing into the calcined gypsum slurry utilized to produce the gypsum wallboard a composition comprising a admixture of a hydroxy containing organic amine and a silanic hydrogen containing silicone compound. The components are added to the gypsum slurry and react to form a polymer lattice while the gypsum is solidifying. This results in water resistance which is throughout the gypsum not just surface water resistance. There are many building operations in which water resistance throughout the board is very important. One such example is outdoor surfaces for buildings. Such sheets are exposed to rain and can break down if not properly treated.

The amine component of the invention conforms to the following structure;

$(R)_n-N-(R^1)_m$ wherein
R is alkyl having from 4 to 40 carbon atoms;
$R^1$ is selected from —H, and —$R^2$—H
$R^2$ is —(CH$_2$CH$_2$—O)a—, —(CH$_2$CH(CH$_3$)O)b—;
a and b are independently integers from 1 to 10;
n and m are integers from 0 to 3 with the proviso that n+m=3;
in a preferred embodiment R is $R^3$—O—(CH$_2$CH$_2$—O)x(CH$_2$CH(CH$_3$)—O)y—(CH$_2$CH$_2$—O)z—(CH$_2$)$_3$— wherein;

$R^3$ is alkyl having from 4 to 40 carbon atoms;
x, y and z are independently integers ranging from 0 to 10.

The silanic hydrogen containing silicone compound conforms to the following structure;

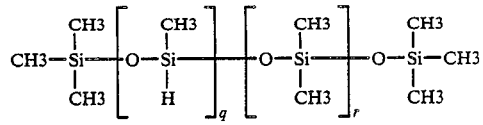

wherein;
q and r are independently integers from 1 to 1,000.

Gypsum wallboard is generally made by depositing a plastic gypsum mass or slurry between fibrous liners, pressing the mass to a desired thickness by means of rollers, allowing the gypsum to set and harden before cutting the formed gypsum board, and finally passing the formed gypsum board through a dryer to remove excess moisture. Lightweight gypsum board is the product obtained by incorporating an aerated foam with the gypsum, thereby causing the production of air spaces in the gypsum mass, with resulting lightening of the finished gypsum board.

EXAMPLES

Amine Component

Class 1 (Alkyl Amines)

| Reactant # | R |
|---|---|
| R—N—(CH$_2$CH$_2$—OH)$_2$ | |
| 1 | C12 H25 |
| 2 | C14 H29 |
| 3 | C20 H42 |
| 4 | C18 H37 |
| | = |
| 5 | C18 H35 |
| 6 | C20 H41 |
| | (Guerbet) |
| 7 | C8 H17 |
| 8 | C10 H21 |
| 9 | C6 H13 |
| 10 | C4 H9 |
| 11 | C40 H 42 |
| | (Guerbet) |
| R—N(H)—CH$_2$CH$_2$—OH | |
| 12 | C12 H25 |
| 13 | C14 H29 |
| 14 | C20 H42 |
| 15 | C18 H37 |
| | = |
| 16 | C18 H35 |
| 17 | C20 H41 |
| | (Guerbet) |
| 18 | C8 H17 |
| 19 | C10 H21 |
| 20 | C6 H13 |
| 21 | C4 H9 |
| 22 | C40 H 42 |
| | (Guerbet) |
| R—N—CH$_2$CH(CH$_3$)OH)$_2$ | |
| 23 | C12 H25 |
| 24 | C14 H29 |
| 25 | C20 H42 |
| 26 | C18 H37 |
| | = |
| 27 | C18 H35 |
| 28 | C20 H41 |
| | (Guerbet) |
| 29 | C8 H17 |
| 30 | C10 H21 |
| 31 | C6 H13 |
| 32 | C4 H9 |

-continued

| Reactant # | R |
|---|---|
| 33 | C40 H42 (Guerbet) |

Class 2 (Ether Amines)

$R^3$—O—(CH$_2$CH$_2$—O)x(CH$_2$CH(CH$_3$)—O)y—(CH$_2$CH$_2$—O)z—(CH$_2$)$_3$N(CH$_2$CH$_2$—OH)$_2$

| Reactant # | R | x | y | z |
|---|---|---|---|---|
| 34 | C12 H25 | 0 | 0 | 0 |
| 35 | C14 H29 | 1 | 0 | 2 |
| 36 | C20 H42 | 10 | 0 | 10 |
| 37 | C18 H37 = | 0 | 2 | 0 |
| 38 | C18 H35 | 5 | 5 | 5 |
| 39 | C20 H41 (Guerbet) | | | |
| 40 | C8 H17 | 10 | 10 | 10 |
| 41 | C10 H21 | 0 | 0 | 0 |
| 42 | C6 H13 | 5 | 10 | 5 |
| 43 | C4 H9 | 0 | 6 | 1 |
| 44 | C40 H42 (Guerbet) | | | |

$R^3$—O—(CH$_2$CH$_2$—O)x(CH$_2$CH(CH$_3$)—O)y—(CH$_2$CH$_2$—O)z—(CH$_2$)$_3$$\overset{H}{N}$(CH$_2$CH$_2$OH)

| Reactant # | R | x | y | z |
|---|---|---|---|---|
| 45 | C12 H25 | 0 | 0 | 0 |
| 46 | C14 H29 | 0 | 0 | 0 |
| 47 | C20 H42 | 0 | 0 | 0 |
| 48 | C18 H37 = | 0 | 0 | 0 |
| 49 | C18 H35 | 0 | 0 | 0 |
| 50 | C20 H41 (Guerbet) | | | |
| 51 | C8 H17 | 0 | 0 | 0 |
| 52 | C10 H21 | 0 | 0 | 0 |
| 53 | C6 H13 | 0 | 0 | 0 |
| 54 | C4 H9 | 0 | 0 | 0 |
| 55 | C40 H42 (Guerbet) | | | |

$R^3$—O—(CH$_2$CH$_2$—O)x(CH$_2$CH(CH$_3$)—O)y—(CH$_2$$\overset{CH_3}{C}$HO)z—(CH$_2$)$_3$$\overset{H}{N}$(CH$_2$CH$_2$OH)

| Reactant # | R | x | y | z |
|---|---|---|---|---|
| 56 | C12 H25 | 0 | 0 | 0 |
| 57 | C14 H29 | 5 | 6 | 7 |
| 58 | C20 H42 | 6 | 3 | 6 |
| 59 | C18 H37 = | 0 | 0 | 0 |
| 60 | C18 H35 | 10 | 1 | 6 |
| 61 | C20 H41 (Guerbet) | | | |
| 62 | C8 H17 | 0 | 0 | 0 |
| 63 | C10 H21 | 1 | 5 | 6 |
| 64 | C6 H13 | 10 | 10 | 10 |
| 65 | C4 H9 | 0 | 0 | 0 |
| 66 | C40 H42 (Guerbet) | | | |

Silicone intermediates of the type used to make the compounds of this invention are well known to those skilled in the art. International Publication (*Silicone Alkylene Oxide Copolymers As Foam Control Agents*) WO 86/0541 by Paul Austin (Sept. 25, 1986) teaches how to make intermediates useful in this invention, and is incorporated herein by reference.

The silanic hydrogen containing silicone compound are selected from;

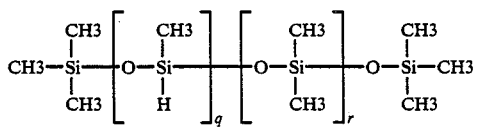

| Reactant # | q | r |
|---|---|---|
| 67 | 50 | 50 |
| 68 | 90 | 10 |
| 69 | 10 | 90 |
| 70 | 99 | 1 |

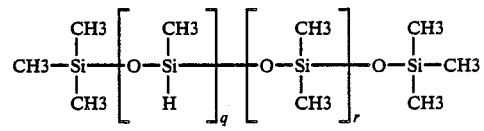

| Reactant # | q | r |
|---|---|---|
| 71 | 1 | 99 |
| 72 | 50 | 150 |
| 73 | 150 | 50 |
| 74 | 100 | 0 |
| 75 | 100 | 1 |
| 76 | 25 | 25 |
| 77 | 5 | 5 |
| 78 | 10 | 0 |
| 79 | 100 | 250 |

Preparation of Gypsum Blocks

EXAMPLE 80

To 35 grams of gypsum obtained from Custom Building Products Lithia Springs Ga., is added 350 grams of water and 0.1 grams of Reactant 1 and 0.1 grams of silicone polymer silicone example 67. The resulting mass is mixed well and poured into cubes 2×2×2 inch and allowed to dry for 24 hours at 110° F.

EXAMPLE 81-100

Example 80 is repeated, only substituting reactant #3 for reactant 1 and silicone polymer example for example 67.

| Example # | Amine Reactant # | Silicone Polymer Reactant # |
|---|---|---|
| 81 | 6 | 70 |
| 82 | 11 | 74 |
| 93 | 22 | 77 |
| 84 | 28 | 67 |
| 85 | 31 | 67 |
| 86 | 44 | 77 |
| 87 | 37 | 68 |
| 88 | 65 | 78 |
| 89 | 66 | 79 |
| 90 | 61 | 68 |
| 91 | 60 | 74 |
| 92 | 56 | 73 |
| 93 | 50 | 77 |
| 94 | 42 | 70 |
| 95 | 5 | 69 |
| 96 | 7 | 69 |
| 97 | 13 | 70 |
| 98 | 37 | 71 |
| 99 | 65 | 72 |
| 100 | 55 | 73 |

EVALUATION

Cubes made as described are placed into a pan of 70° F. water for 2 hours. After the two hours the cubes are removed, the excess water blotted off and weighed immediately.

$$\% \text{ Absorption} = \frac{(\text{wet weight} - \text{dry weight})}{\text{dry weight}} \times 100$$

Results

Prior Art Compounds

| Material | % Absorption |
|---|---|
| Silanic Hydrogen Compound alone (ie. no amine) | 36.0 |
| No additive | 71.2 |

Compounds of the Invention

| Example | % Absorption |
|---|---|
| 81 | 16.5 |
| 82 | 20.2 |
| 85 | 16.9 |
| 86 | 17.3 |
| 93 | 26.0 |
| 94 | 20.0 |
| 95 | 18.8 |
| 99 | 16.6 |
| 100 | 17.1 |

As can be seen the compounds of the present invention give outstanding water resistance to gypsum materials.

What is claimed:

1. A composition prepared by the polymerization reaction of a silanic hydrogen containing polydimethylsiloxane polymer with an organic amine having from 4 to 40 carbon atoms said reaction to take place by admixing said silanic hydrogen containing polydimethylsiloxane polymer with said organic amine in an aqueous slurry of a cementitious material.

2. The composition of claim 1 wherein said organic amine conforms to the following structure;

$$(R)_n-N-(R^1)_m$$

wherein;
R is alkyl having from 4 to 40 carbon atoms;
$R^1$ is selected from —H, and —$R^2$—H
$R^2$ is —($CH_2CH_2$—O)a—, —($CH_2CH(CH_3)O$)b—;
a and b are integers independently ranging from 1 to 10;
n and m are integers from 0 to 3 with the proviso that n+m=3.

3. The composition of claim 2 wherein R is $$R^3-O-(CH_2CH_2-O)_x(CH_2CH(CH_3)-O)_y-(CH_2CH_2-O)_z-(CH_2)_3-$$

wherein;
$R^3$ is alkyl having from 4 to 40 carbon atoms;
x, y and z are independently integers ranging from 0 to 10.

4. The composition of claim 1 wherein said silanic hydrogen containing polydimethylsiloxane polymer conforms to the following structure;

$$CH_3-\underset{\underset{CH_3}{|}}{\overset{\overset{CH_3}{|}}{Si}}-\left[O-\underset{\underset{H}{|}}{\overset{\overset{CH_3}{|}}{Si}}\right]_q-\left[O-\underset{\underset{CH_3}{|}}{\overset{\overset{CH_3}{|}}{Si}}\right]_r-O-\underset{\underset{CH_3}{|}}{\overset{\overset{CH_3}{|}}{Si}}-CH_3$$

wherein;
q and r are independently integers from 1 to 1,000.

5. The composition of claim 2 wherein
$R^1$ is —$R^2$—H;
$R^2$ is —($CH_2CH_2$—O—)—.

6. A composition of claim 1 wherein said cementitious material is gypsum.

7. A composition of claim 1 wherein said cementitious material is portland cement.

8. A composition of claim 1 wherein said cementitious material is cement.

9. A composition of claim 2 wherein R is a guerbet radical.

10. A process for rendering cementitious materials water resistant which comprises the polymerization reaction of a silanic hydrogen containing polydimethylsiloxane polymer with an organic amine having from 4 to 40 carbon atoms said reaction to take place by admixing said silanic hydrogen containing polydimethylsiloxane polymer with an organic amine in an aqueous slurry of a cementitious material.

11. The process of claim 10 wherein said organic amine conforms to the following structure;

$$(R)_n-N-(R^1)_m$$

wherein;
R is alkyl having from 4 to 40 carbon atoms;
$R^1$ is selected from —H, and —$R^2$—H
$R^2$ is —($CH_2CH_2O$)a—, —($CH_2CH(CH_3)O$)b—;
a and b are integers independently ranging from 1 to 10;
n and m are integers from 0 to 3 with the proviso that n+m=3.

12. The process of claim 11 wherein R is

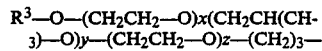

wherein;

R³ is alkyl having from 4 to 40 carbon units;

x, y and z are independently integers ranging from 0 to 10.

13. The process of claim 11 wherein said silanic hydrogen containing polydimethylsiloxane polymer conforms to the following structure;

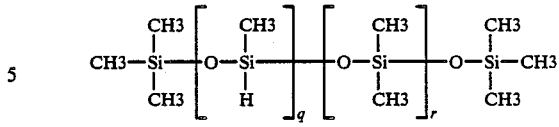

wherein;
q and r are independently integers from 1 to 10,000.

14. The process of claim 11 wherein
R¹ is —R²—H;
R² is —(CH₂CH₂—O—)—.

15. The process of claim 11 wherein
R¹ is —R²—H;
R² is —(CH₂CH(CH₃)O)₃—.

16. A process of claim 11 wherein said cementitious material is gypsum.

17. A process of claim 11 wherein said cementitious material is portland cement.

18. A process of claim 11 wherein said cementitious material is cement.

19. A process of claim 11 wherein R is a guerbet radical.

* * * * *